US011425678B2

(12) United States Patent
Files et al.

(10) Patent No.: US 11,425,678 B2
(45) Date of Patent: *Aug. 23, 2022

(54) SYSTEM AND METHOD FOR BEAMSTEERING ACQUISITION AND OPTIMIZATION IN AN ENHANCED REALITY ENVIRONMENT

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,493

(22) Filed: Nov. 30, 2020

(65) Prior Publication Data

US 2021/0243719 A1 Aug. 5, 2021

Related U.S. Application Data

(63) Continuation of application No. 16/779,267, filed on Jan. 31, 2020, now Pat. No. 10,856,253.

(51) Int. Cl.
| | | |
|---|---|---|
| *H04W 16/28* | (2009.01) | |
| *H04W 64/00* | (2009.01) | |
| *H04W 36/00* | (2009.01) | |
| *H04B 10/50* | (2013.01) | |
| *H04B 10/112* | (2013.01) | |

(52) U.S. Cl.
CPC ...... *H04W 64/006* (2013.01); *H04B 10/1129* (2013.01); *H04B 10/502* (2013.01); *H04W 16/28* (2013.01); *H04W 36/0022* (2013.01)

(58) Field of Classification Search
CPC .......... H04W 64/006; H04W 36/0022; H04W 16/28; H04W 4/80; H04B 10/502; H04B 10/1129
See application file for complete search history.

(56) References Cited

U.S. PATENT DOCUMENTS

| | | |
|---|---|---|
| 7,111,786 B2 | 9/2006 | Schmidt |
| 10,097,301 B2 | 10/2018 | Abdelmonem |
| 10,178,560 B2 | 1/2019 | Black |

(Continued)

*Primary Examiner* — Marcus Hammonds
(74) *Attorney, Agent, or Firm* — Prol Intellectual Property Law, PLLC; H. Kenneth Prol

(57) ABSTRACT

An information handling system, may include a positional sensor to estimate a position of the information handling system relative to a light-enabled 5G access point; a plurality of light sensors to detect light emitted from a light source of the light-enabled 5G access point in an area to determine relative angle data descriptive of an angle of the information handling system relative to the light-enabled 5G access point; a light sensing directionality comparison module to compare the estimated position of the information handling system with the relative angle data and update location data; and a beamsteering module to: conduct beamsweeping of a plurality of angles for a mm-wave antenna array using the light sensing directionality location data as an initial seed angle; determine a selected beamsteering pattern from the information handling system to the light-enabled 5G access point to initiate the mm-wave communication.

20 Claims, 7 Drawing Sheets

(56) References Cited

U.S. PATENT DOCUMENTS

| | | | |
|---|---|---|---|
| 10,203,762 B2 | 2/2019 | Bradski | |
| 10,812,125 B1* | 10/2020 | Badic | H04W 72/085 |
| 2015/0248786 A1 | 9/2015 | Schowengerdt | |
| 2017/0195893 A1* | 7/2017 | Lee | H04W 64/003 |
| 2018/0376275 A1* | 12/2018 | Jiang | H01Q 3/36 |
| 2019/0257933 A1* | 8/2019 | Nath | H01Q 21/064 |

* cited by examiner

SYSTEM AND METHOD FOR BEAMSTEERING ACQUISITION AND OPTIMIZATION IN AN ENHANCED REALITY ENVIRONMENT

This application is a continuation of prior application Ser. No. 16/779,267, entitled "SYSTEM AND METHOD FOR BEAMSTEERING ACQUISITION AND OPTIMIZATION IN AN ENHANCED REALITY ENVIRONMENT," filed on Jan. 31, 2020, which is assigned to the current assignee hereof and is incorporated herein by reference in its entirety.

FIELD OF THE DISCLOSURE

The present disclosure generally relates to information handling systems and more specifically relates to information handling systems that communicate with access points using beamsteering acquisition.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
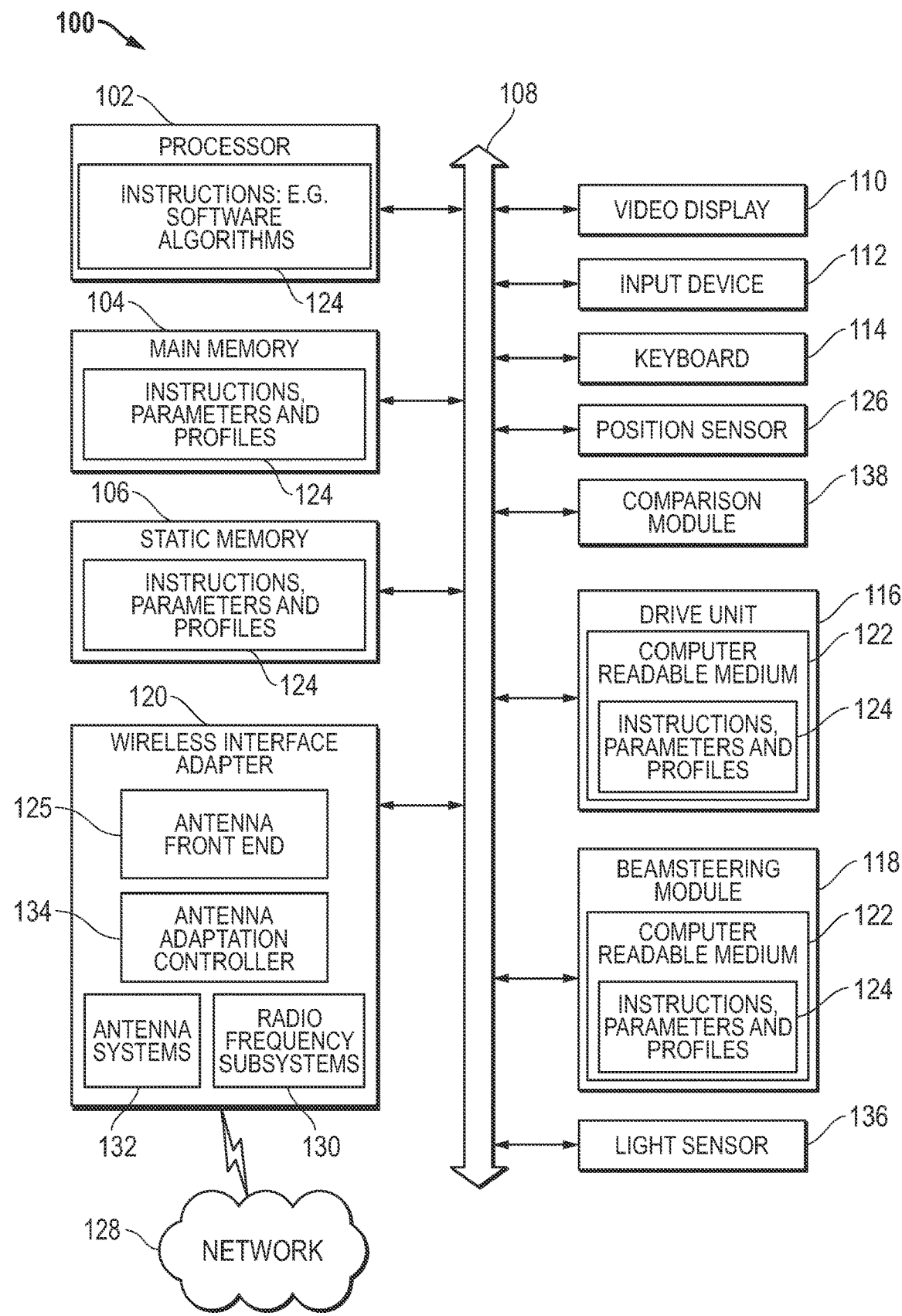
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provides for an information handling system that optimizes directional signal transmissions of a mm-wave antenna or array of mm-wave antennas. Because of the short wavelengths of the mm-wave frequencies (e.g., frequency range (FR) 1 and FR2), the distance between the 5G access points and the mm-wave antenna as well as objects placed between the 5G access points and the mm-wave antenna may degrade the signal quality available. This degradation of signal quality may be especially noticeable during use of high throughput processes associated with certain activities such as those associated with information handling systems employing enhanced reality (ER) systems that include, among others, augmented reality (AR) systems and virtual reality (VR) systems. In some embodiments descried herein, the information and data accumulated during operation of the light sensing directionality system on an information handling system may be used to as initial seed data to determine the angle to which a main lobe of the mm-wave emitted by the mm-wave antenna is directed. This data may include any positional data related to the location identification of the information handling system (e.g., ER system) within a room or other area the information handling system has been deployed along with known positional locations of light sources emitted from light enabled 5G access points or from one or more light source constellation points in an area. As used in the present specification, the term "enhanced reality system," "enhanced reality device," or "enhanced reality environment" is meant to be understood as any system, device, or environment that is enhanced using an information handling system to provide haptic cues, olfactory cues, audible cues, and/or visual cues that are not part of the real world experiences.

In an embodiment, the information handling system includes a processor, a memory, and a positional sensor to acquire positional data and estimate a position of the information handling system relative to a light-enabled 5G access point based on the acquired positional data. In an embodiment, the light-enabled 5G access point includes a light source to be detected by the information handling system. In an embodiment, the information handling system may further include a plurality of light sensors of a light sensing directionality system to scan for and detect light emitted from a light source of the light-enabled 5G access point or constellation points placed at known locations in an area to determine relative angle data descriptive of an angle of the information handling system relative to the light-enabled 5G access point; a light sensing directionality comparison module to, when executed by the processor, compare the estimated position of the information handling system with the relative angle data and update location data descriptive of the location of the information handling system relative to the light-enabled 5G access point. In an embodiment, the number of light sensors is two or more. In an embodiment, the information handling system may further include a beamsteering module to, when executed by the processor: conduct beamsweeping of a plurality of angles for a mm-wave antenna array at the information handling system using the light sensing directionality system generated location data as an initial seed angle for the beamsweeping; determine a selected beamsteering pattern from the information handling system to the light-enabled 5G access point to initiate the mm-wave communication with the light-enabled 5G access point based on signal quality above a threshold level; and determine that the information handling system is within range of the light-enabled 5G access point to enable the mm-wave connection between the information handling system and light-enabled 5G access point using the selected beamsteering pattern.

In addition, in some embodiments, the light sensors of the light sensing directionality in embodiments herein may detect an infrared light emitted from the light source of the light-enabled 5G access point emitted at a pulse pattern recognizable by the light sensors. Although the present specification describes the 5G access point as a light-enabled 5G access point that, itself, emits a light to be detected by a light sensor at the information handling system, the present description contemplates the environment in which the information handling system operates includes a light emitting source apart from the 5G access point. In this embodiment, the light emitting source may include a base station specifically used during use of the ER system to provide the light sensing directionality location data as described herein.

In other embodiments, the information handling system may be the light source with light, such as infrared light emitters, mounted at known locations on the information handling system. In such embodiments, the 5G access point or points or constellation points may include light sensors as light-enabled the light sensing directionality system may operate similar to embodiments as described herein. The information handling system may include a positional sensor that provides data via an "inside-out" manner. In this embodiment, the information handling system (e.g., in the form of a headset of an ER system in an embodiment) implements a plurality of, for example, infrared lights (e.g., IR light emitting diodes (LEDs)) that are detectable by one or more light detectors used to determine the position of the information handling system within an area.

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of an enhanced reality (ER) system in some embodiments. In the present specification and in the appended claims, the term "enhanced reality" is meant to be understood as any enhancement of the real-world via computer-generated perceptual information. An ER system may include an augmented reality (AR) system where real-world objects viewable by a user are augmented with computer-generated perceptual information includes visual enhancements, auditory enhancements, haptic enhancements, somatosensory enhancements, and olfactory enhancements. An ER system may include a virtual reality (VR) system that uses a display device and other output devices to completely immerse a user within an environment that may be similar to or completely different from a real-world environment. A VR system may include, for example, a VR headset that generates realistic images, sounds, and other sensations the simulate a user's physical presence within a virtual environment. An ER system may include a mixed reality system that includes the merging of real-world and virtual world images, sounds, smells, and haptic output to produce new environments and visualizations, where physical and digital objects co-exist and interact in real-time. Because of the relatively higher computations and data used with these ER systems, the data transmission to, for example, a 5G mm-wave access point would increase the usability and operability of the ER system.

The information handling system 100 may include a memory (volatile (e.g. random-access memory, etc.), nonvolatile (read-only memory, flash memory etc.) or any combination thereof), one or more processing resources, such as a central processing unit (CPU), the processor 102 illustrated in FIG. 1, a graphics processing unit (GPU), hardware or software control logic, or any combination thereof. Additional components of the information handling system 100 may include one or more storage devices, one or more communications ports for communicating with external devices, as well as, various input and output (I/O) devices, such as a keyboard 114, a mouse, a video/graphic display 110, or any combination thereof. Further components of the information handling system 100 for use with embodiments herein may include positional sensors 126 such as location sensors, movement sensors, or orientation sensors as described in various embodiments herein. Positional sensors 126 may be any of gyroscope, an accelerometer, a global positioning satellite (GPS) sensor, magnetometer, orientation sensor, a tilt sensor, Hall sensors, or the like that may be used to detect angle of an information handling system, motion, and position of portions, such as a display chassis with respect to a base chassis, in various configurations. For example, the system may determine various configurations of a convertible laptop information handling system as a display chassis is opened to a variety of angles with respect to a base chassis. Further components for use with embodiments herein on the information handling system 100 include one or more light sensors 136 or light sources in some embodiments which may include an array of light sensors 136 or light sources or reflectors whose fixed position on the information handling system may be used for determining orientation or location. Light sensors 136 may be any form of light sensor including camera systems such as integrating use of webcams, infrared sensors, and other camera systems already deployed with the information handling system or implementing additional light sensors 136 (such as additional cameras). The information handling system 100 may also include one or more buses operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems 100 according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of the beamsteering module 118, light sensing directionality comparison module 138, and drive unit 116 (volatile (e.g. random-access memory, etc.), nonvolatile (read-only memory, flash memory etc.) or any combination thereof). The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, three-dimensional (3D) mouse, or gesture or touch screen input), wired glove, motion controller, and a keyboard 114. The information handling system 100 may also include a disk drive unit 116.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. Further, connectivity of the information handling system 100 to, for example, a 5G access point, may be available using any protocols related to a mm-wave and 5G standard or similar standards as described herein.

Wireless adapter 120, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Wireless adapter 120, in an embodiment, may connect to any 5G access point using a plurality of radio frequency (RF) bands that include those RF bands that emit RF waves higher than 6 GHz. In an embodiment, the wireless interface adapter 120 may be communicatively coupled to an array of 5G frequency antennas 132 (referred to as millimeter-wave (mm-wave) antennas) used to communicate with a 5G access point. The mm-wave antennas 132 may support a 5G wireless communication protocol so that relatively higher amounts of data may be transmitted between the information handling system 100 and any 5G access point of a network.

The wireless interface adapter 120 may further include an antenna front end system 125 which may operate to modulate and demodulate signals, set signal transmission power levels or sensitivity to signal reception, select channels or frequency bands, and conduct other functions in support of wireless transmission. The antenna adaptation controller 134 may execute instructions as disclosed herein for monitoring wireless link state information, information handling system configuration data, SAR proximity sensor detection, or other input data to generate channel estimation and determine antenna radiation patterns. For example, instructions or a controller may execute software or firmware applications or algorithms which utilize one or more wireless links for wireless communications via the wireless interface adapter 120 as well as other aspects or components. In the embodiments presented herein, the antenna adaptation controller 134 may execute instructions as disclosed herein to conduct beamsweeping, beamsteering of the beamsteering module 118, and transmit a communications signal from an antenna system 132 in order to transmit an electromagnetic wave at the target frequency or harmonics thereof. The term "antenna system" described herein is meant to be understood as any object that emits a RF (RF) electromagnetic (EM) wave therefrom.

Additionally, the antenna adaptation controller 134 may prevent noise sourced beyond the speaker grill from creating interference with the determined frequency, or harmonics thereof. In the embodiments presented herein, the antenna adaptation controller 134 may execute instructions as disclosed herein to adjust, via a parasitic coupling element, change the directionality and/or pattern of the emitted RF signals from the antenna.

The antenna adaptation controller 134 may implement adjustments to wireless antenna systems and resources via a radio frequency integrated circuit (RFIC) front end 125 and WLAN or WWAN radio module systems within the wireless interface device 120. The antenna adaptation controller 134, in an embodiment, may implement adjustments to wireless antenna systems that operate on frequencies related to those 5G networks (i.e., high frequency (HF) band, very high frequency (VHF) band, ultra-high frequency (VHF) band, L band, S band, C band, X band, Ku band, K band, Ka band, V band, W band, and millimeter wave bands). Aspects of the antenna optimization for the antenna adaptation controller 134 may be included as part of an antenna front end 125 in some aspects or may be included with other aspects of the wireless interface device 120 such as WLAN radio module such as part of the radio frequency (RF) subsystems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns emitted by the speaker grill, an antenna element, and any parasitic coupling element operations in various embodiments.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a beamsteering module 118, a light sensing directionality comparison module 138, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, the light sensing directionality comparison module 138, and the beamsteering module 118 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including an estimated training duration table. The disk drive unit 116 and static memory 106 may also contain space for data storage. Further, the instructions 124 may embody one or more of the methods or logic as described herein. For example, instructions relating to the light sensing directionality comparison module 138 and beamsteering module 118 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the light sensing directionality comparison module 138 and beamsteering module 118 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The light sensing directionality comparison module 138 and beamsteering module 118 may be stored in static memory 106, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the light sensing directionality comparison module 138 that may be operably connected to the bus 108. The computer readable medium 122 of the light sensing directionality comparison module 138 may also contain space for data storage. The light sensing directionality comparison module 138 may, according to the present description, perform tasks related to comparing an estimated position of the information handling system with a relative angle data and update location data obtained from one or more positional sensors and a plurality of light sensors, respectively. The light sensing directionality comparison module 138 conducts this comparison and updates location data that is descriptive of the location of the information handling system relative to the light-enabled 5G access point. In some embodiments, the light sensing directionality location data is used by the beamsteering module 118 to conduct a beamsweeping process in order to discover and communicate with one or more of the light-enabled 5G access points.

In an embodiment, the light sensing directionality comparison module 138 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

The information handling system 100 may also include the beamsteering module 118 that may be operably connected to the bus 108. The computer readable medium 122 of the beamsteering module 118 may also contain space for data storage. The beamsteering module 118 may, according to the present description, perform tasks related to conducting beamsweeping of a plurality of angles for a mm-wave antenna array at the information handling system using the light sensing directionality location data as an initial seed angle for the beamsweeping. The beamsteering module 118 may, according to the present description, further perform tasks related to determining a selected beamsteering pattern from the information handling system to the light-enabled 5G access points to initiate the mm-wave communication with the light-enabled 5G access points based on signal quality above a threshold level. The beamsteering module 118 may, according to the present description, further perform tasks related to determining that the information handling system is within range of the light-enabled 5G access point to enable the mm-wave connection between the information handling system and light-enabled 5G access point using the selected beamsteering pattern. In some embodiments, the beamsteering module 118 may further forward the light sensing directionality location data to the light-enabled 5G access point using the wireless interface adapter 120 to cause the light-enabled 5G access point to conduct beamsweeping of a plurality of angles for a mm-wave antenna array at the light-enabled 5G access point using the light sensing directionality location data as an initial seed angle for the beamsweeping.

In an embodiment, the beamsteering module 118 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
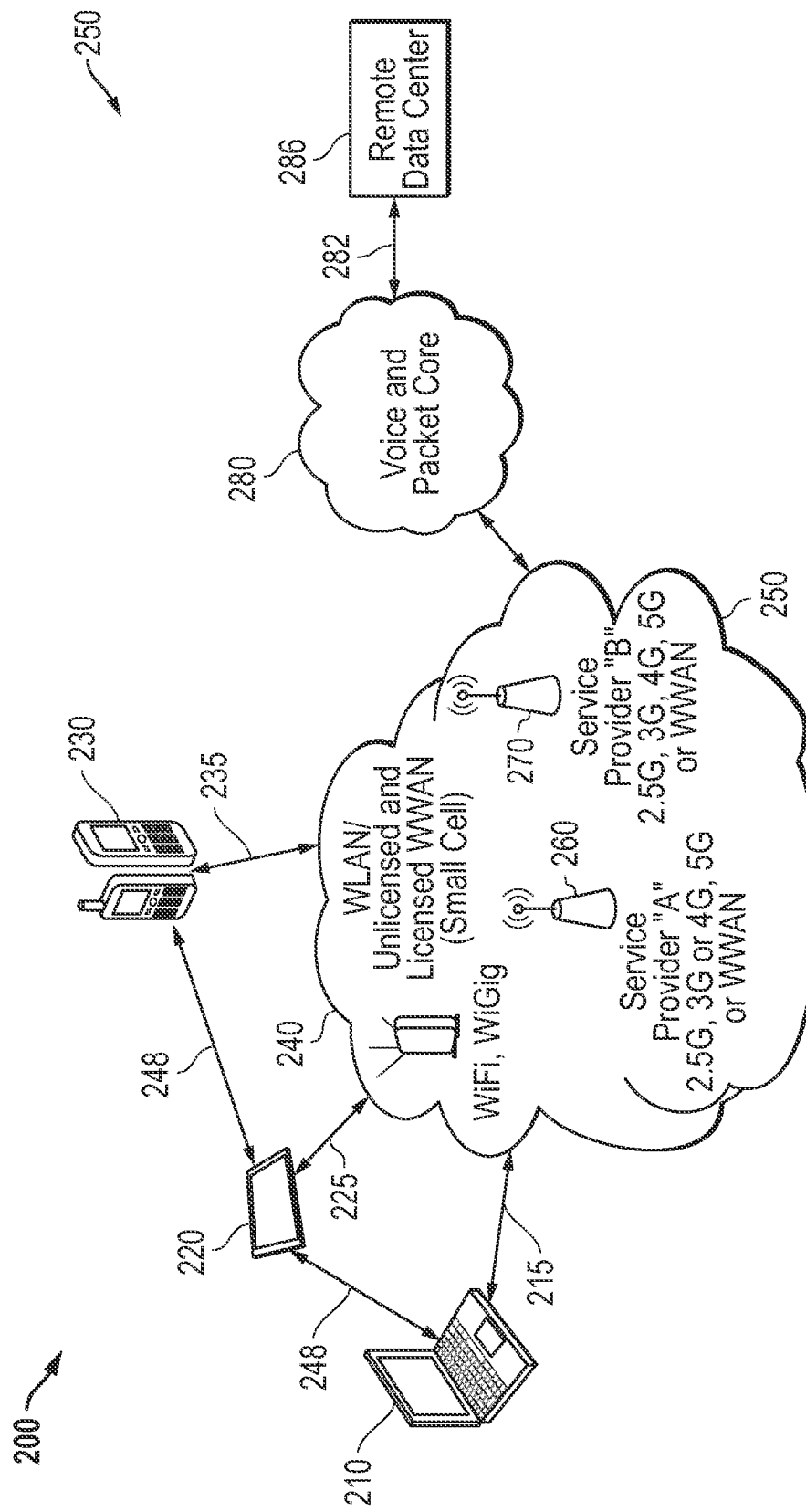
FIG. 2 is a block diagram of a network environment offering several communication protocol options and mobile information handling systems according to an embodiment of the present disclosure.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. FIG. 2 is a block diagram of a network environment 200 offering several communication protocol options and mobile information handling systems according to an embodiment of the present disclosure. FIG. 2 illustrates a network 200 that can include one or more information handling systems 210, 220, 230 that may include the information handling system described in connection with FIG. 1. In a particular embodiment, network 200 includes networked mobile information handling systems 210, 220, and 230, 5G wireless access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, a smart phone device or other computing devices. These mobile information handling systems 210, 220, and 230, may access a wireless local network 240, or they may access a macro-cellular network 250 via the 5G access points or light-enabled 5G access points. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Components of a wireless local network may be connected by wireline or Ethernet connections to a wider external network. For example, wireless 5G access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or 5G small cell WWAN communications such as eNodeB, IEEE 802.11, IEEE 1914/1904, IEEE P2413/1471/42010, or similar wireless network protocols developed for 5G communications. In an embodiment, the networked mobile information handling systems 210, 220, and 230 may communicate via any 5G protocol used to transmit mm-wave frequencies.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, or other network structure. Such a connection 282 may be made via an access point/Ethernet switch to the external network and be a backhaul connection. The access point may be connected to one or more wireless access points before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. In an example where the mobile information handling system 210, 220, and 230 includes an ER system, those processing resources at the remote data centers may supplement the high volume of processing used to provide those enhanced reality environments described herein. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as a 5G access point or even potentially a WWAN connection via small cell communication on licensed or unlicensed WWAN connections. Concurrent wireless links to information handling systems 210, 220, and 230 may be connected via any access points including other mobile information handling systems as illustrated in FIG. 2.

Figure 3:
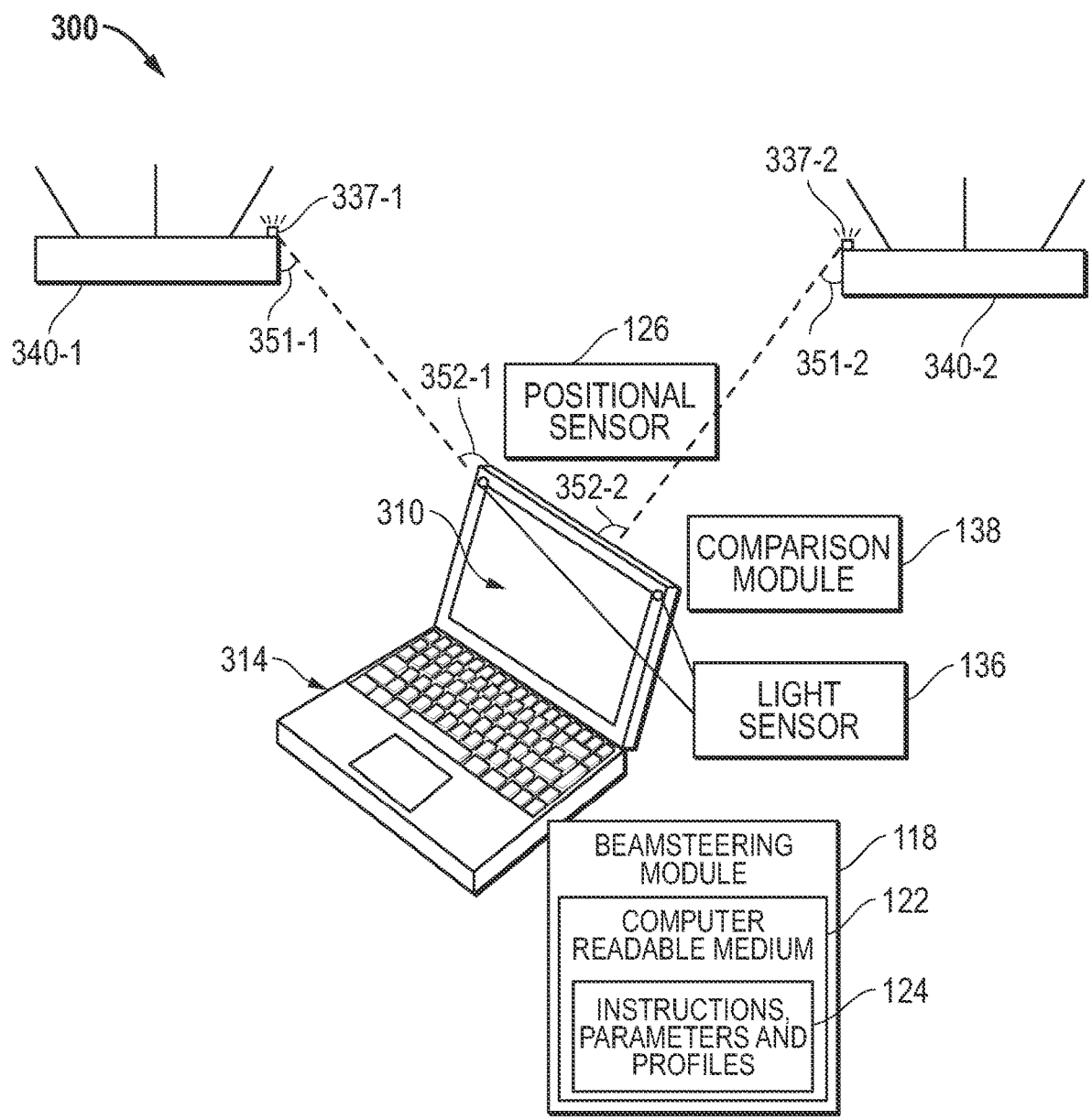
FIG. 3 is a block diagram illustrating an information handling system with millimeter-wave wireless capability according to an embodiment of the present disclosure.

FIG. 3 is a block diagram illustrating an information handling system 300 according to an embodiment of the present disclosure. The information handling system 300 may be any type of device that computes, classifies, processes, transmits, receives, retrieves, originates, switches, stores, displays, manifests, detects, records, reproduces, handles, or uses any form of information, intelligence, or data for business, scientific, control, entertainment, or other purposes. In the example shown in FIG. 3, the information handling system 300 is a laptop device that includes a screen portion 310 including a screen to present visual data to a user. The information handling system 300 may also include a keyboard portion 314 that includes a number of actuatable keys that allows a user to provide input to the information handling system 300. Via interaction with the keyboard portion 314 by a user, the user may input data into the information handling system 300 and receive output from the screen portion 310. In the embodiments described herein, the information handling system 300 may include one or more antenna system locations where both sub-six GHz and RF EM waves higher than 6 GHz may be transceived. Any number of antenna systems may be present and may include an array of antennas that emits RF EM waves at 6 GHz or more. Although FIG. 3 shows the information handling system 300 as a laptop computing device, the present description contemplates that any type of computing device and/or combination of computing devices may be used to execute the processes and methods described herein including an ER system as described herein.

The information handling system 300 may include a light sensing directionality comparison module 138. As described herein, light sensing directionality comparison module 138 may, according to the present description, perform tasks related to comparing an estimated position of the information handling system with a relative angle data and update location data obtained from one or more positional sensors and a plurality of light sensors, respectively. The light sensing directionality comparison module 138 conducts this comparison and updates light sensing directionality location data that is descriptive of the location of the information handling system relative to the one or more light-enabled 5G access points 340-1 and 340-2 or one or more known light emitting constellation locations in the area such as a room. In some embodiments, the light sensing directionality location data is used by the beamsteering module 118 to conduct a beamsweeping process in order to discover and communicate with one or more of the light-enabled 5G access points 340-1 and 340-2. The beamsteering initialization process will determine an optimal angle 352-1 or 352-2 from the information handling system 300 for node directionality of its mm-wave antenna array to light-enabled 5G access point 340-1 or 340-2 in some embodiments. The selected beamsteering pattern may be transmitted to the selected light-enabled access point 340-1 or 340-2 to direct its mm-wave antenna array to a reciprocal angle 351-1 or 351-2 in some embodiments. In other embodiments, the beamsteering initialization process will determine an optimal angle 351-1 or 351-2 from the light-enabled 5G access point 340-1 or 340-2 to information handling system 300 for node directionality of its mm-wave antenna array to in some embodiments. The selected beamsteering pattern may be transmitted from the selected light-enabled access point 340-1 or 340-2 to the information handling system 300 to direct its mm-wave antenna array to a reciprocal angle 352-1 or 352-2 in some other embodiments.

The information handling system 300 includes the beamsteering module 118 which may execute instructions via one or more controllers such as an antenna adaptation controller, on a processor, or on some combination. The beamsteering module 118 may be executed by a controller or processor of the information handling system 300 to calculate a selected beamsteering pattern, via a beamsweeping process, from the information handling system 300 to a 5G access point 340-1 or 340-2 to initiate the mm-wave communication with the 5G access point 340-1 or 340-2 along an angle such as 352-1 or 352-2 for directing the mm-wave antenna array. In a further aspect, the beamsteering module 118 may determine that the information handling system 300 is within range of the light-enabled 5G access point 340-1 or 340-2 to enable the mm-wave connection between the information handling system 300 and access point 340-1 or 340-2 using the calculated beamsteering pattern. The beamsteering module 118 may modulate the RF EM waves emitted by a mm-wave antenna array of the information handling system 300 such that the node directionality of those RF EM waves is directed to reach the 5G access point 340-1 or 340-2 and increase the reliability of the mm-wave connection between the information handling system 300 and the 5G access point 340-1 or 340-2. Directionality of the beamsteering pattern selected may also increase the distance the information handling system 300 may be from the 5G access point 340-1 or 340-2 while still providing reliable connectivity.

In an embodiment, the beamsteering module 118 may be responsible for sending location data to the 5G access point 340-1 or 340-2 to allow the 5G access point to calculate a reciprocal beamsteering pattern from the 5G access point 340-1 or 340-2 to the information handling system 300 to enable a mm-wave communication from the 5G access point. A mm-wave antenna array on the light-enabled 5G access point 340-1 or 340-2 may have node directionality steered toward the information handling system 300 in a reciprocal angle 351-1 or 351-2. In other embodiments, the beamsteering module 118 on the light-enabled 5G access point 340-1 or 340-2 may instead conduct beamsweeping and select a beamsteering pattern directed to the information handling system 300. Further, in some embodiments, the sensors may be located on the light-enabled 5G access point 340-1 or 340-2 or a known light-enabled constellation location in the room while the information handling system 300 is light enabled with light transmitters for determining updates to the light sensing directionality location data via a light sensing directionality comparison module to positional data.

According to the above, the information handling system 300 may send and receive 5G-level data to and from the 5G access point 340-1 or 340-2. Still further, a positional sensor 126 may be used by the information handling system 300 to monitor the position, orientation, and location of the information handling system 300 within an area and relative to any given 5G access point 340-1 or 340-2. Additionally, the light sensing directionality location data may be used by the information handling system 300 to determine if and when to hand over mm-wave communication to another 5G access point when it is determined, based on positional data and relative angle data, that the mm-wave connection cannot be maintained unless a new connection to a new mm-wave access point is established.

According to these embodiments, the information handling system 300 may be initially communicatively coupled to an access point via the transmission of a light source from the 5G access point to a plurality of light sensors at the information handling system 300. Upon detection of the light at the light sensors 136, the information handling system 300 may detect an angle of the 5G access point relative to the information handling system 300. In an embodiment, distance data may also be obtained from the detection of the light at the light sensors 136 descriptive of the distance of the information handling system 300 relative to the 5G access points 340-1 and 340-2. The light sensors 136 may be any level of light sensor including in particular embodiments with respect to the light constellation orientation system embodiment or simultaneous localization and mapping (SLAM) process systems described herein. Light sensors 136 may be one or more camera systems such as charge-coupled device (CCD) cameras. The light sensors 136 may be required to be an array of light sensors 136, such as the arrays of CCD cameras, to assess light curtain or light constellation points from known locations to determine locations and orientations or to fine tune shifts in location detected by other position sensors. After acquiring the angle and distance data, the beamsteering module 118 may initiate a mm-wave communication protocol with the 5G access point 340-1 or 340-2. In an embodiment, the 5G access points 340-1 or 340-2 may be communicatively coupled to, for example, an edge gateway that allows for communication between the 5G access points 340-1 or 340-2 so as to pass the angle data and distance data descriptive of the location of the information handling system 300 within a physical space so that handoffs from one 5G access point to another appears as a seamless process to a user of the information handling system 300. As such the information handling system 300 may be physically tracked via use of the positional sensor 126 and light sensors 136 within the three-dimensional space so that such a handoff may occur.

The modulation of the RF EM waves by the beamsteering module 118 may be accomplished using any beamsteering process. In an embodiment, the beamsteering module 118 may implement a beam sweeping processes such as covering a spatial area with a set of beams transmitted and received according to pre-specified intervals and directions. In yet another embodiment, the beam sweeping process may spot check multiple node directions beginning with the seed angle direction determined from light sensing directionality location data as determined in embodiments above and compare beamsteering pattern signal quality measurements. In an embodiment, the beamsteering module 118 may implement a beam measurement processes by engaging in any evaluation of a quality of any received signal. In an embodiment, the beamsteering module 118 may implement a beam determination process such as a process that includes a selection of the suitable beam or beams according to the measurements obtained with the beam measurement procedure. In an embodiment, the beamsteering module 118 may implement a beam reporting process that sends beam quality and beam decision information across the network of 5G access points.

Figure 4:
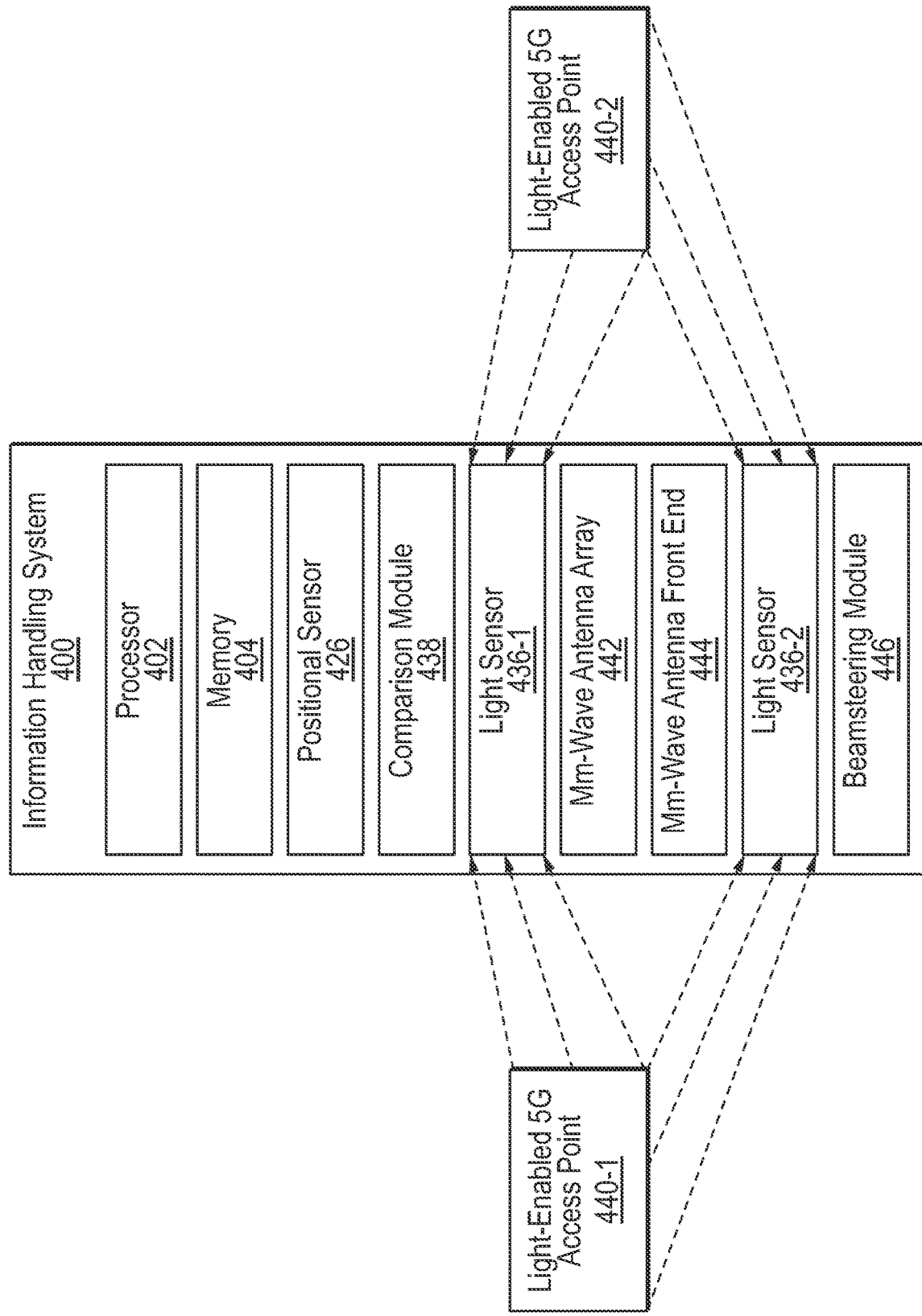
FIG. 4 is a block diagram illustrating an information handling system with millimeter-wave wireless capability according to an embodiment of the present disclosure.

FIG. 4 is a block diagram illustrating an information handling system 400 according to an embodiment of the present disclosure. The information handling system 400 may include an array of mm-wave antennas 442. In an embodiment, the array of array of mm-wave antennas 442 may be communicatively coupled to a mm-wave antenna front end 444. The mm-wave antenna front end 444 may serve as part of a radio frequency (RF) integrated circuit (IC), for example, that is formed between the array of mm-wave antennas 310 and a baseband system on chip (SoC). The mm-wave antenna front end 444 may be a dedicated front end independent of any other front-end RF ICs, or may be combined with other front-end RF ICs formed within the information handling system 400. In an embodiment, the RF IC may be used to control and drive data signals at the communication bands described herein as well as modulate, demodulate, and amplify those RF signals, among other functions.

During operation, the information handling system 400 may acquire positional data from one or more positional sensors 426. The positional sensors 426 may be any of gyroscope, an accelerometer, a global positioning satellite (GPS) sensor, or a tilt sensor. With these types of devices, the information handling system 400 may estimate the position of the information handling system 400 within an area such as a room.

The position estimate may generally locate the information handling system 400 within to room so that a comparison may be made with other location data using a light sensing directionality comparison module 438. The light sensing directionality comparison module 438 may compare the estimated position of the information handling system 400 to relative angle data descriptive of an angle of the information handling system relative to the light-enabled 5G access point. The relative angle data may be acquired through the use of light sensors 436-1 and 436-2 placed on the information handling system 400 that scan for and detect light emitted from a light source or reflectors placed at known locations in an area to determine relative angle data descriptive of an angle of the information handling system relative to the light-enabled 5G access point.

In an embodiment, an array of light sources or light sensors 436-1 and 436-2 must be used either on the mobile information handling system or as constellation light point landmarks throughout the area such as a room including on one or more light-enabled 5G access points 440-1 and 440-2. The light sensors 436-1 and 436-2 may be various levels of light sensors including one or more camera systems, such as one or more CCD cameras, including one or more cameras on the mobile information handling system, such as existing web cameras. Multiple light sensors maybe required to collect trajectories of light sources, such as light-enabled 5G access points 440-1 and 440-2, that may come at an information handling system from multiple trajectories around an area such as a room. Further, the more of an array of light sensors 436-1 and 436-2 on the information handling system 400, the more specific an orientation of the information handling system 400 and its one or more mm-wave antenna arrays 442 may be discerned for angle data relative to the light-enabled 5G access points 440-1 and 440-2. Such angle data of orientation and position of the information handling system 400 relative to the light-enabled 5G access points 440-1 and 440-2 may be used to determine light sensing directionality location data that may be used for beamsteering.

For example, a light or infrared light curtain, such as used by a Lighthouse-type light based tracking technology may be utilized within a room or area of position and relative angle tracking for a mobile information handling system. The light sensors may include one or more camera system with charge coupled devices (CCD) to detect the light from a plurality of constellation light points or reflected light points. In an embodiment, the one or more light sources or light sensors may be placed on the of the light-enabled 5G access points 440-1 and 440-2 or at constellation points around an area to which the information handling system 400 is to be communicatively coupled to. Camera systems may detect the light sources as landmarks as well as a plurality of reflectors or other light sources placed at landmark locations around an area. In an embodiment, the light source may be one or more dedicated light stands that are placed at known locations within the area relative to the 5G access points. For ease of explanation, the light source will be described herein as the light-enabled 5G access points 440-1 and 440-2 and any level of camera system or light sensor described as a light sensor 436-1 and 436-2 as illustrated in FIG. 4. Upon comparing the estimated position of the information handling system 400 with the relative angle data, the light sensing directionality comparison module 438 updates light sensing directionality location data descriptive of the location of the information handling system 400 relative to the light-enabled 5G access point.

The information handling system 400 may further include a mm-wave antenna array 442 operatively coupled to the mm-wave antenna front end 444. The mm-wave antenna array 442 may include a plurality of mm-wave antennas that each emit a mm-wave at a specific frequency in order to cooperate to change a main lobe of a radiation pattern. In an embodiment, the beamsteering may be accomplished by cooperatively adjusting the phases of the radiofrequency (RF) signals at each of the elements to adjust directionality of the lobe of a radiating pattern. The mm-wave antenna array 442 and mm-wave antenna front end 444 may be operatively coupled to the beamsteering module 446. The beamsteering module 446 may, according to the present description, conduct a beamsweeping process at a plurality of angles for a mm-wave antenna array at the information handling system using the light sensing directionality location data as an initial seed angle for the beamsweeping. The beamsteering module 446 may, according to the present description, further performs tasks related to determining a selected beamsteering pattern from the information handling system 400 to the light-enabled 5G access points 440-1 and 440-2 to initiate the mm-wave communication with the light-enabled 5G access points 440-1 and 440-2 based on signal quality above a threshold level. The beamsteering module 446 may, according to the present description, further perform tasks related to determining that the information handling system 400 is within range of the light-enabled 5G access points 440-1 and 440-2 to enable the mm-wave connection between the information handling system 400 and light-enabled 5G access points 440-1 and 440-2 using the selected beamsteering pattern. In some embodiments, the beamsteering module 446 may further forward the selected beamsteering pattern direction to the light-enabled 5G access points 440-1 and 440-2 using a wireless interface adapter. This may cause the selected light-enabled 5G access points 440-1 or 440-2 to conduct beamsteering to direct a lobe of RF EM transmission of its mm-wave antenna array system toward the mobile information handling system. In this way, reciprocally beamsteering between the selected light-enabled 5G access points 440-1 or 440-2 and information handling system may optimize 5G mm-wave wireless communications whose frequency bands may be otherwise limited by distance or by potential obstacles.

In some other embodiments, the beamsteering module 446 may further forward the light sensing directionality location data to the light-enabled 5G access points 440-1 and 440-2 for them to conduct the beamsteering process including beamsweeping, which may be resource consuming, to select a beamsteering pattern angle. The initial light sensing directionality location data, determined via a Lighthouse type light curtain from light-enabled 5G access points 440-1 and 440-2 for example, may be transmitted via the wireless interface adapter on any wireless protocol available. The light-enabled 5G access points 440-1 and 440-2 may use the received light sensing directionality location data to conduct beamsweeping of a plurality of angles for a mm-wave antenna array at the light-enabled 5G access points 440-1 and 440-2 using the light sensing directionality location data as an initial seed angle for the beamsweeping in such embodiments. Then a selected beamsteering pattern angle may be transmitted to the information handling system 400 to determine a reciprocal angle of the mm-wave antenna array 442 directionality toward the selected light-enabled access point 440-1 or 440-2.

Figure 5:
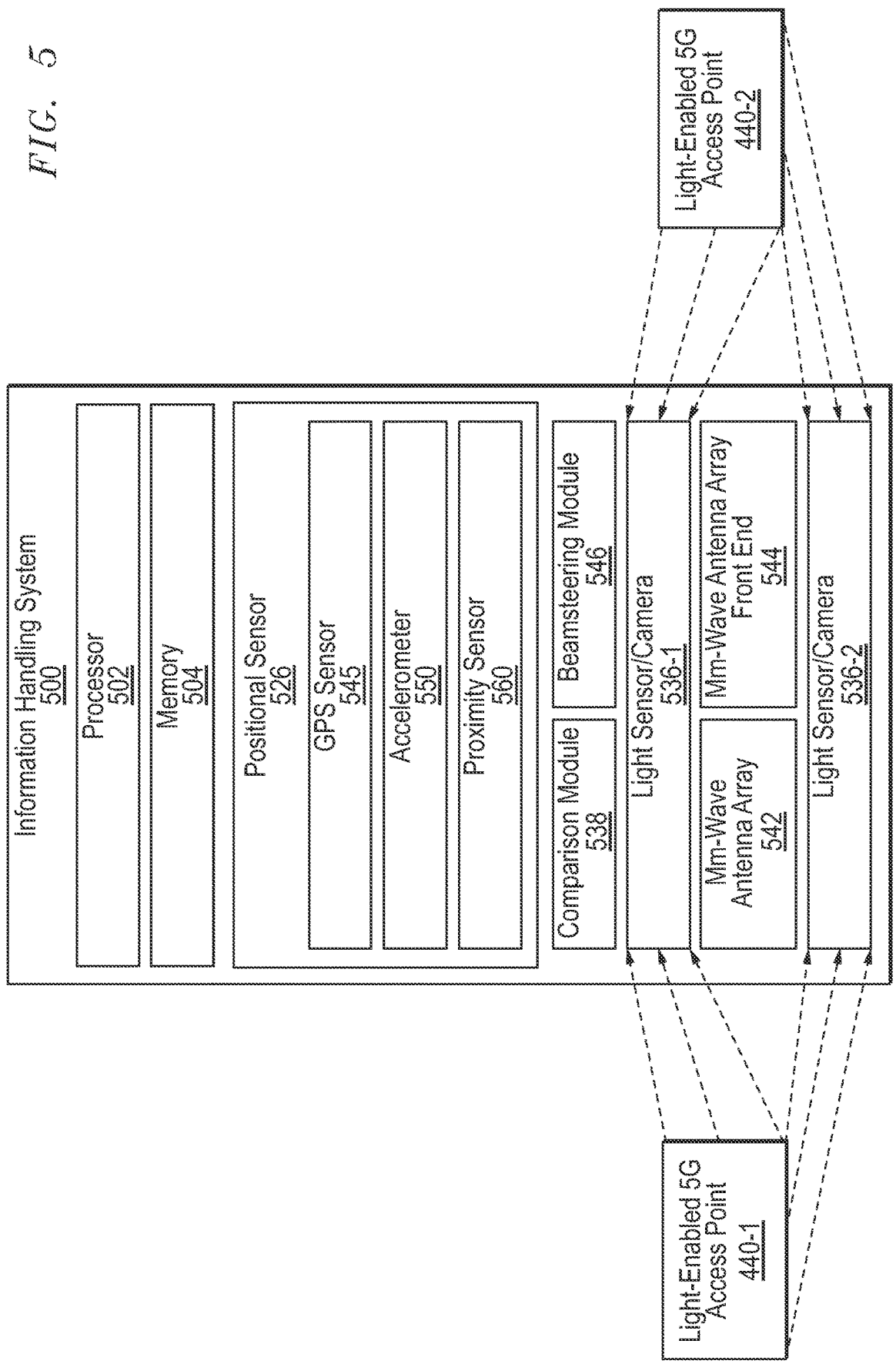
FIG. 5 is a block diagram illustrating an information handling system with millimeter-wave wireless capability according to an embodiment of the present disclosure.

FIG. 5 is a block diagram illustrating an information handling system 500 according to an embodiment of the present disclosure. In the embodiment of FIG. 5, the information handling system 500 includes a positional sensor 526. The positional sensor 526 may include any number and type of sensors 545, 550, 555, 560 that allows the information handling system 500 to acquire positional data so as to estimate a position of the information handling system 500 within a room or other area. In an embodiment, the positional sensor 526 acquires positional data by concurrently mapping an unknown area the information handling system 500 is in and tracking the location of the information handling system 500 within that unknown area. In an embodiment, the positional sensor 526 may include one or more of a GPS sensor 545, an accelerometer 550, a camera 555, and a proximity sensor 560. Additional positional sensors 526 may include gyroscopes, magnetometers, orientation sensors, or similar systems.

With each of the positional sensors 526, in an embodiment, the processor 502 may implement a simultaneous localization and mapping (SLAM) process to iteratively calculate the distance and angle of the light-enabled 5G access point relative to the information handling system. The SLAM system may, in some embodiments, be partially executed via wireless connectivity via any available protocol with external processing or database resources in some embodiments. A SLAM process may involve real-time processing of the current location of the information handling system 500 within a surrounding environment and simultaneous predictive processing of a future position of the information handling system 500. This is done with respect to a plurality of landmarks that may be detected constellation points of light place in an area such as a room. In example embodiments, the constellation points of light serving as area landmarks with respect to the mobile information handling system may include a plurality of light-enabled 5G access points or other place light sources or reflectors in the area. It is further understood that in some embodiments, the mobile information handling system may include an array of light sources or light reflectors that may be detected for a SLAM processing system operating via one or more light-enable 5G access points in some embodiment.

The real-time SLAM processing may begin, in an embodiment, by determining the location of the information handling system 500 within its surrounding environment and providing an area location map or a virtual image construct of the area or room in which the SLAM system may operate.

In example embodiments where an information handling system may be a headset of an ER system (either of the full surrounding environment as in VR, or of an object viewed as being incorporated within the surrounding environment as in AR), the virtual image may be displayed to a user from the perspective of the headset to the user via, for example, a display screen. In order to accurately project what the surrounding environment looks like in real life from the perspective of the proximity sensors 560 (which may be opaque such that surrounding environment cannot be viewed), or to project an object such that it accurately incorporates into the viewable surrounding environment, the position of the information handling system 500 within the surrounding environment may be accurately determined.

Similarly, to track angle data and orientation of a mm-wave antenna array 542 to establish or maintain accurate beamsteering directionality, the position of information handling system 500 with known mounting location and direction of mm-wave antenna array 542 within the surrounding environment may be accurately determined such as via a SLAM system. A real-time SLAM process may gauge the location of the information handling system 500 within its environment by either determining the location of the information handling system 500 with respect to a previous known location of the information handling system 500 or with respect to one or more landmarks, such as light-enabled 5G access points or light source constellation locations within the surrounding environment. The current location of the information handling system 500 with respect to a previous location of the information handling system 500 may be determined by comparing readings taken from a global positioning system (GPS) unit 545, a camera 555, an accelerometer 550, an inertial measurement unit (IMU), and/or an eCompass unit within the information handling system 500 to previous readings taken by the same units. Such a comparison may yield a known change in location, as well as a known velocity of the information handling system 500.

Embodiments of the present disclosure may use an inside-out localization process to determine the position of an information handling system 500 from one or more landmarks identified within a two or three-dimensional image of such landmarks. A light source such as from a light-enabled 5G access point 440-1 or 550-2, or other known light constellation point in the area or room, may serve as such landmarks. Images may be captured of the area or light locations sensed by light sensors 536-1 or 536-2 in embodiments herein. In particular, the SLAM system may work with light sensors 536-1 or 536-2 that are camera systems as described in embodiments herein. In particular, CCD cameras may operate as one or more light sensors 536-1 or 536-2.

Each instance in time at which an image is captured or light is otherwise sensed by light sensors 536-1 or 536-2 in relation to an area location map constructed for the landmarks in a room, this may be associated with an instantaneous perspective of the surrounding environment from the information handling system 500, accompanied by identification of those landmarks (e.g., and their distances from the information handling system 500), referred to as a SLAM frame. Determination of the location of the landmark(s) within an image may be associated with some degree of uncertainty. Comparing multiple SLAM frames that include the same landmark may decrease the uncertainty associated with the identification of that landmarks position. In other words, the uncertainty associated with the identification of a given position of a landmark or landmark(s) may decrease while the system "learns" about its surrounding environment by moving around in it from frame to frame. In other embodiments, the landmarks in each environment may be identified from scratch during each separate user session.

The SLAM system in embodiments of the present disclosure determine the position of the information handling system 500, at least in part based on images of surrounding landmarks captured prior to a given user session or captured during the user session. For example, two or three-dimensional images of landmarks at the information handling system 500 environment may have been previously captured and stored within a SLAM lookup repository accessible by the information handling system 500 or a remotely located, wirelessly connected information handling system in some embodiments. Such images may be captured by the same or other information handling systems 500, other two or three-dimensional cameras, or robotic rovers, and/or may be retrieved from crowd-sourced locations or cloud storage locations in some embodiments. Identification of one or more landmarks in such images may be made prior to or during a current user session either by the SLAM system or by other systems in embodiments. Thus, the locations of such identified landmarks, such as light-enabled 5G access points 440-1 or 440-2, in embodiments may be made during a current user session by the SLAM system, or may have been made prior to the user session. In some embodiments, the SLAM repository may store fully-mapped SLAM frames that combine an image of a landmark, its identification as light-enabled 5G access points 440-1 or 440-2 or other light source constellation points, and its positional information with respect to the camera or other light sensor 536-1 or 536-2 that captured the image (e.g. bearing and range).

The SLAM system in embodiments of the present disclosure may retrieve SLAM frames from the SLAM repository, or generate SLAM frames from images retrieved from the SLAM repository in order to compare against SLAM frames generated in real-time during a current user session in some embodiments. By comparing multiple SLAM frames of the same landmark to one another, the SLAM system in embodiments of the present disclosure may increase the accuracy of the determined position of the information handling system 500 with respect to such landmarks. In such a way, the SLAM system increases the accuracy of localization methods in real-time without the need for a "learning" period. Further, the SLAM system in an embodiment may access SLAM frames stored in a predictive SLAM cache in order to avoid brute force localization methods.

In other embodiments, the SLAM system may need to conduct a learning period to establish position for the SLAM system with respect to as light-enabled 5G access points 440-1 or 440-2 within the room, and then may track changes in movement for purposes of beamsteering as described herein. The information handling system 500, having a measured position, velocity, and acceleration at a given moment in time may be capable of following several different possible trajectories in the future. In order to determine which of these trajectories the information handling system 500 actually takes, a brute force localization method compares the position of the information handling system as reflected in a SLAM frame generated in real-time to each and every projected trajectory, in turn, to determine which one best fits the measured position of the information handling system. In other embodiments, this method may include comparing the real-time SLAM frame to only a subset of possible trajectories for tracking movement changes with respect to the landmarks (e.g., the light-enabled 5G access points 440-1 or 440-2).

The information handling system 500 may also include one or more mm-wave antenna arrays 542 operatively coupled to the mm-wave antenna front end 544. The mm-wave antenna array 542 may include a plurality of mm-wave antennas that each emit a mm-wave at a specific frequency in order to cooperate to change a main lobe of a radiation pattern. In an embodiment, the beamsteering may be accomplished by cooperatively adjusting the phases of the radiofrequency (RF) signals at each of the elements to adjust directionality of the lobe of a radiating pattern. The mm-wave antenna array 542 and mm-wave antenna front end 544 may be operatively coupled to the beamsteering module 546. The beamsteering module 546 may, according to the present description, conduct a beamsweeping process at a plurality of angles for a mm-wave antenna array at the information handling system using the light sensing directionality location data as developed from the SLAM system described in the present embodiment as an initial seed angle for the beamsweeping. The beamsteering module 546 may, according to the present description, further performs tasks related to determining a selected beamsteering pattern from the information handling system 500 to the light-enabled 5G access points 440-1 and 440-2 to initiate the mm-wave communication with the light-enabled 5G access points 440-1 and 440-2 based on signal quality above a threshold level. The beamsteering module 546 may, according to the present description, further perform tasks related to determining that the information handling system 500 is within range of the light-enabled 5G access points 440-1 and 440-2 to enable the mm-wave connection between the information handling system 500 and light-enabled 5G access points 440-1 and 440-2 using the selected beamsteering pattern. In some embodiments, the beamsteering module 546 may further forward the selected beamsteering pattern direction to the light-enabled 5G access points 440-1 and 440-2 using a wireless interface adapter. This may cause the selected light-enabled 5G access points 440-1 or 440-2 to conduct beamsteering to direct a lobe of RF EM transmission of its mm-wave antenna array system toward the mobile information handling system. In this way, reciprocally beamsteering between the selected light-enabled 5G access points 440-1 or 440-2 and information handling system may optimize 5G mm-wave wireless communications whose frequency bands may be otherwise limited by distance or by potential obstacles.

In some other embodiments, the beamsteering module 546 may further forward the light sensing directionality location data developed pursuant to a SLAM system described in embodiments herein to the light-enabled 5G access points 440-1 and 440-2. Thus, the light-enabled 5G access points 440-1 and 440-2 may conduct the beamsteering process including beamsweeping, which may be resource consuming, to select a beamsteering pattern angle. The initial light sensing directionality location data, determined via the SLAM system from light-enabled 5G access points 440-1 and 440-2 for example, may be transmitted via the wireless interface adapter on any wireless protocol available. The light-enabled 5G access points 440-1 and 440-2 may use the received light sensing directionality location data to conduct beamsweeping of a plurality of angles for a mm-wave antenna array at the light-enabled 5G access points 440-1 and 440-2 using the light sensing directionality location data as an initial seed angle for the beamsweeping in such embodiments. The light-enabled 5G access points 440-1 and 440-2 may determine a selected access point and also a beamsteering pattern toward the mobile information handling system 500. Then a selected beamsteering pattern angle may be transmitted to the information handling system 400 to determine a reciprocal angle of the mm-wave antenna array 442 directionality toward the selected light-enabled access point 440-1 or 440-2.

Figure 6:
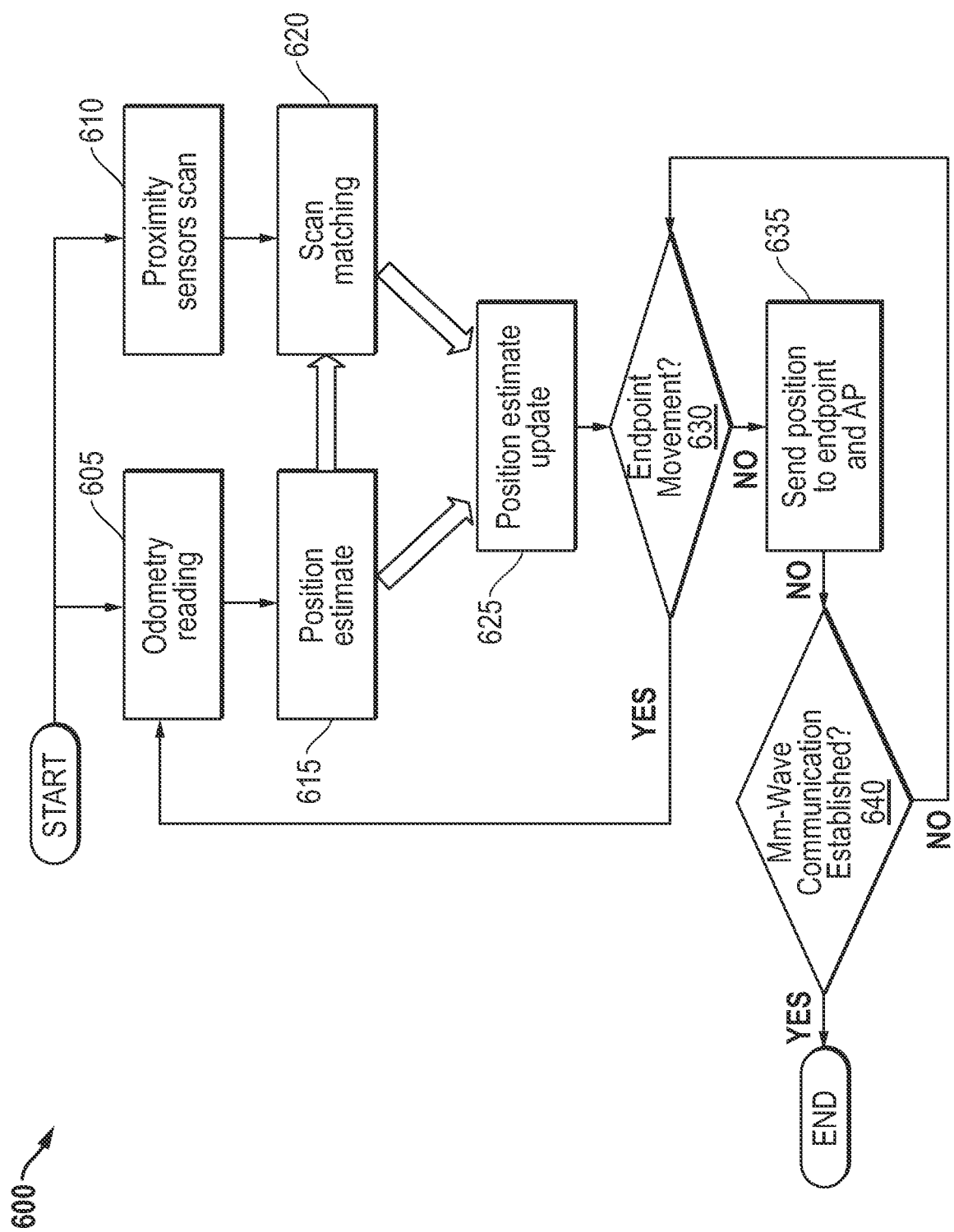
FIG. 6 is a flow diagram illustrating a method of establishing a millimeter-wave connection with an access point utilizing light sensing directionality according to an embodiment of the present disclosure.

FIG. 6 is a flow diagram illustrating a method 600 of establishing a millimeter-wave connection with an access point according to an embodiment of the present disclosure. The method 600 may include acquiring, at block 605, positional data and other odometry readings from one or more positional sensors as described herein. The positional sensor may include one or more of a GPS sensor, an accelerometer, a camera, or other sensor used to estimate, at block 615, a position of the information handling system.

Concurrently, the method 600 may include initiating a proximity scan at block 610. The proximity scan may include the use of one or more light-enabled 5G access points that emits light at the light-enabled 5G access point placed at known locations in an area to determine relative angle data descriptive of an angle of the information handling system relative to the light-enabled 5G access point. In example embodiments, this may include assessing light may shine onto the mobile information handling system with light sensors or cameras embedded to determine the location of the information handling system relative light constellation locations and orientations. In other embodiments, a SLAM frame may be generated and establish a location mapping construct for the mobile information handling system relative to landmarks of the light-enable 5G access point or other landmarks in the area detected by the light sensors or cameras. The information handling system includes a plurality of light sensors that detect the light emitted by the light-enabled 5G access point and may use light sensing directionality techniques of embodiments herein to determine angular and proximity data. This angular and proximity data may reflect a relative angle to a light-enabled 5G access points that may be used in beamsteering as described herein. It is understood that one or both embodiments of determining light sensing directionality location data may utilize infrared light in embodiments herein. In systems utilizing the light curtain technique from two or more light sources within a room or area, the trigger for such a technique may be sensing the transmitted light, such as IR light, forming the light curtain from the one or more light-enabled 5G access points or other light source constellation points in the room or area. In embodiments where a SLAM process is used with SLAM frames as enhanced by positional sensors generating odometry readings of 605, a location change may trigger the SLAM system which may be always on.

The estimated position of the information handling system with the relative angle data may be matched, at block 620, in order to update location data descriptive of the location of the information handling system relative to the light-enabled 5G access point. At block 625 the position of the information handling system may be updated and the relative angle data may be used as an initial seed angle for the mobile information handling system to conduct beamsweeping for selection of a beamsteering pattern of the mm-wave antenna array directionality. The beamsweeping may be conducted as described in various embodiments herein and a beamsteering pattern may be selected based on signal quality with the relative angle data indicating a likely direction that may provide a best signal with at least one of the light-enabled 5G access points.

The method 600 may also include detecting, at block 630, whether the endpoint or information handling system has moved. If no movement is detected (NO determination at block 630) the estimated position is sent to the endpoint or information handling system and the light-enabled 5G access point selected for mm-wave communication. The selected light-enabled 5G access point may then determine a reciprocal mm-wave antenna array pattern direction toward the mobile information handling system.

If movement is detected at block 630 (YES determination at block 630) the motion of the endpoint detected at block 630 initiates the method 600 again in order to proceed with acquiring odometry readings at block 605 and initiating a proximity sensor scan via the one of the light sensing directionality embodiments described at block 610. The amount of movement may reach a threshold to trigger a reassessment of angles for an initial seed angle to conduct beamsweeping again with respect to locations of light-enabled 5G access points, or may be a minor adjustment that may be adjusted by the beamsteering module.

It may be determined at block 640 whether a mm-wave communication has been established. Where a mm-wave communication has been established (YES determination at block 640), the process may end. Then the process may be initiated again upon detection of movement or upon a new initialization of a mm-wave communication when one of the light sensing directionality systems of the embodiments herein are present. Where a mm-wave communication has not been established (NO determination at block 640), the process may return to block 630 to detect that the endpoint or information handling system has moved or another issue has arisen. Then the system may proceed with acquiring odometry readings at block 605 and initiating a proximity sensor scan at block 610.

In an embodiment, this method 600 may continuously and iteratively be completed as the information handling system moves throughout the room or are the information handling system has been deployed within.

Figure 7:
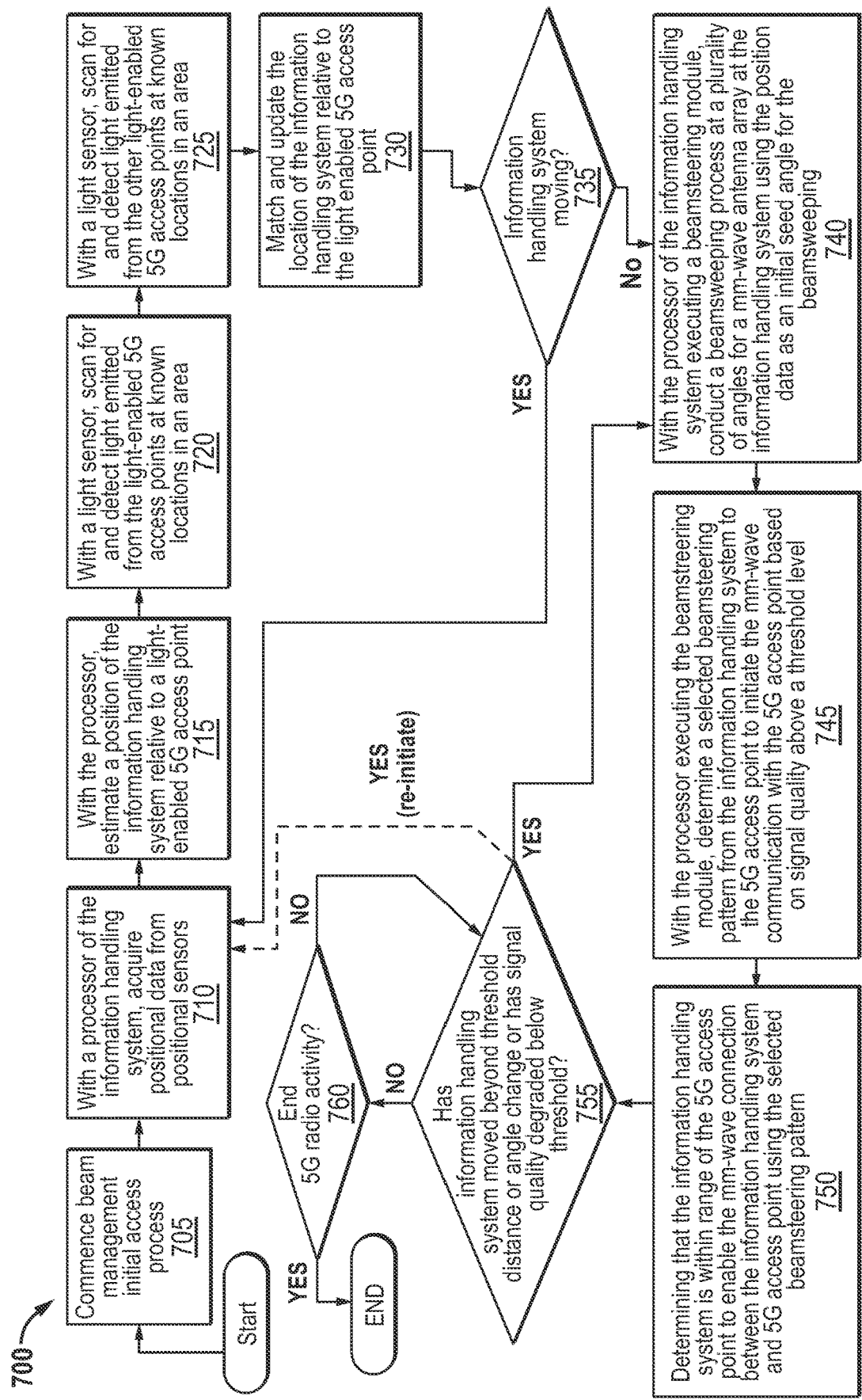
FIG. 7 is a flow diagram illustrating a method of establishing a millimeter-wave connection with an access point utilizing light sensing directionality according to an embodiment of the present disclosure.

FIG. 7 is a flow diagram illustrating a method 700 of establishing a millimeter-wave connection with an access point according to an embodiment of the present disclosure. In an embodiment, the method 700 may begin with commencing a beam management initial access process at block 705. This process may be, in an embodiment, initiated by a processor of the information handling system. The method 700 may proceed with, at the processor of the information handling system acquiring positional data from positional sensors at block 710. As described herein, the positional data of the information handling system may be acquired through activation of for example, a GPS sensor, an accelerometer, gyroscope, magnetometer, orientation sensor, or a camera, among other sensors.

The method 700 may continue, at block 715, with estimating a position of the information handling system relative to a light-enabled 5G access point upon execution of the processor. The estimation may be conducted using any process or algorithm that uses, as input, the data from the positional sensors to determine the position of the information handling system relative within an area or room.

The method 700 may continue, at block 720, with scanning for and detecting light emitted from the light-enabled 5G access point placed at known locations within the area the information handling system is deployed. The scanning and detecting of the light emitted from the light-enabled 5G access point(s) or other light source constellation locations may be completed by a plurality of light sensors operatively coupled to the information handling system. In other embodiments, the light sources or light reflectors may be located on the mobile information handling system and light sensors may be on the light-enabled 5G access point(s) or other light sensing constellation locations according to embodiments herein. Such system may work in reverse to some aspects of the embodiments as described as understood with the difference being relative position sensing of a light curtain, such as an IR curtain, or a SLAM image may be detected by light sensors, such as cameras, viewing or receiving light emitted by the mobile information handling system. Further, in embodiments herein, light may refer to infrared light systems such as infrared light emitting diode light sources that may be used and infrared light sensors.

The scanning and detecting of the light emitted from the light-enabled 5G access point(s) or other light source constellation locations may be completed by a plurality of light sensors operatively coupled to the information handling system according to one or more light sensing directionality tracking system embodiments. In one example embodiment, a light curtain, such as an IR curtain, light sensing directionality tracking system embodiment may be used. This may involve detecting two or more light sources by the information handling system and determining relative position and orientation of the mobile information handling system and its mm-wave antenna array relative to those light sources. The light sources may be one or more light-enabled 5G access points or other light source constellation locations of known location in an area of light sensing directionality tracking. For example, a Lighthouse-type system may be deployed to conduct light sensing directionality tracking. In another example embodiment of a light sensing directionality tracking system, a SLAM tracking system may be utilized with one or more camera systems or other arrays of light sensors may determine SLAM frames of an 2D or 3D image or of a location mapping construct with respect to one or more landmarks that may be light sources. The landmark light sources may be one or more light enabled 5G access points or other landmark light source constellation positions in the area for light sensing directionality tracking. In yet other embodiments, light, such as infrared light, may be directed to an information handling system an reflectors on the information handling system may be used to track the position and orientation of the reflectors relative to the light source and an array of light sensors such as cameras detecting the reflected lights. In yet other embodiments, the information handling system may include the plurality of light sources to track the position and orientation of the mobile information handling system light sources relative to an array of light sensors such as cameras in positions of the tracking area such as on a light-enabled 5G access point and detecting the mobile information handling system lights.

In an embodiment, one or more light sensing directionality tracking system embodiments may be used to determine relative angle data descriptive of an angle of the information handling system relative to the light-enabled 5G access point. In an embodiment, the light sensors may detect pulsed light from the light-enabled 5G access point that may be received by a first of the light sensors at one point in time and by a second of the light sensors at another point in time. This difference in light detection at the light sensors of the information handling system may provide location data descriptive of the placement of the information handling within the area. Different pulsing patterns, frequencies, or the like may also be used to distinguish light enabled 5G access points or other light source constellation locations in some embodiments.

The method 700 may include, at block 730, matching the positional data with the angle data in order to update the detected location of the information handling system relative to the light-enabled 5G access point. By updating the detected location of the information handling system with light sensing directionality tracking data, the movement of the information handling system 735 may be detected at block 735 as well. Where movement is detected (YES determination at block 710), the method 700 may continue with reacquiring the positional data and relative angular data with one or more light sensing directionality tracking system embodiments as described herein.

Where movement is not detected (NO determination at block 710), the method 700 may continue with executing a beamsteering module, conduct a beamsweeping process at a plurality of angles for a mm-wave antenna array at the information handling system using the position data as an initial seed angle for the beamsweeping. This process at block 740 may be conducted, in an embodiment, with a beamsteering module executed by a processor as described herein. For example, the one or more light sensing directionality tracking system embodiments may yield a relative angle between the mobile information handling system and one or more light-enabled 5G access points. This relative angle data may be used as an initial seed angle for direction during beamsteering initialization for mm-wave communications. The process of beamsweeping may be streamlined by utilizing information of the initial seed angle providing initial direction data of where a radiofrequency transmission node should likely be directed. In example embodiments, other directions or zones of directions may be spot checked for signal quality relative to the anticipated initial seed angle direction toward a light-enabled 5G access point. The beamsweeping may conduct measurement and comparison of angle of transmission nodes to eliminate and then select a sufficient or optimal beamsteering pattern that provides directionality to improve operation of 5G mm-wave communications.

The beamsteering module may also, at block 745, determine a selected beamsteering pattern from the information handling system to the 5G access point to initiate the mm-wave communication with the 5G access point based on signal quality above a threshold level. This mm-wave communication from the information handling system may be initiated with the beamsteering pattern selected along an angular direction optimal for communication with a selected light-enabled 5G access point. Further, in some embodiments, the selected beamsteering pattern or relative angle toward the selected light-enabled 5G access point may be transmitted to the selected 5G access point to utilize a reciprocal angle. The light-enabled 5G access point may steer a beam of its mm-wave antenna array toward the mobile information handling system along the reciprocal angle direction during communications with the mobile information handling system.

The method 700 may continue at block 750 with determining that the information handling system is within range of the 5G access point to enable the mm-wave connection between the information handling system and 5G access point using the selected beamsteering pattern. During operation of the information handling system, the data obtained from the use of the positional sensors and light sensors may be used to determine the distance between the light-enabled 5G access point and the information handling system. This distance data may be used to determine the range of the information handling system relative to the light-enabled 5G access point.

The method 700 may include, at block 755, with determining whether the information handling system moved beyond threshold distance, the relative angle has changed, or has signal quality degraded below threshold. In this embodiment, the threshold distance and signal quality threshold may be selected based on the capabilities of the information handling system and light-enabled 5G access points as well as their respective mm-wave antenna arrays.

Where it is determined that the information handling system has moved beyond threshold distance, the relative angle has changed, or the signal quality has degraded below the threshold (YES determination at block 755), the method 700 may continue with re-executing a beamsteering module, conduct a beamsweeping process at a plurality of angles for a mm-wave antenna array at the information handling system using the light sensing directionality position data as an initial seed angle for the beamsweeping as described at block 740. This reassessment of beamsweeping for an improved node direction may occur if the level of movement or angle change is not so substantial that a re-initialization of a mm-wave communication is require. This beamsteering module may initiate the process described at block 740 whenever the information handling system has moved beyond threshold distance, the relative angle has changed, or the signal quality has degraded below the threshold independent of each of these criteria.

In some embodiments, such as where a handover must occur or movement of the mobile information handling system relative to the selected 5G access point is substantial, a re-initiation of mm-wave connection or a hand-over of the mm-wave connection may need to be conducted. To obtain a substantial new direction angle the location position may need to be reassessed with the flow returning for re-initiation to block 710. Then flow may proceed as before with light sensing directionality tracking determination of light sensing directionality location data for relative angle determination to the same or a new light-enables 5G access point in various embodiments. For example, the re-initiation process may occur for the handover light-enabled 5G access point.

Where it is determined that the information handling system has not moved beyond threshold distance, the relative angle has not changed, or the signal quality has not degraded below the threshold (YES determination at block 755), the method 700 may continue with deciding whether the 5G radio activity is to be ended at block 760. In an embodiment, certain triggering events may indicate the ending of radio activity at block 760. These triggering events may include closing of a laptop computing device, specific orientation of the headset of the ER system, actuation of a power button, placement of the information handling system into a sleep state, among other triggering events. When it has been determined that the 5G radio activity should not end (NO decision at block 760), the method 700 may return to block 755 with monitoring movement tracking with the light sensing directionality tracking for a determination that the information handling system moved beyond threshold distance, the relative angle has changed, or has signal quality degraded below threshold and to what level that change may have happened. In this embodiment, the threshold distance and signal quality threshold may be selected based on the capabilities of the information handling system and light-enabled 5G access points as well as their respective mm-wave antenna arrays. In an embodiment where 5G radio activity is to end (YES determination at block 760), the process may end.

The blocks of the flow diagrams of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory;
   a positional sensor to acquire positional data and estimate a position of the information handling system relative to a light-enabled 5G access point based on the acquired positional data;
   a plurality of light sensors to scan for and detect light emitted from a light source of the light-enabled 5G access point placed at known locations in an area to determine relative angle data descriptive of an angle of the information handling system relative to the light-enabled 5G access point;
   a light sensing directionality comparison module utilizing light sensors detecting a light source of a light-enabled 5G access point to, when executed by the processor, utilize the estimated position of the information handling system with relative angle data to the light enabled 5G access point to assist selecting a beamsteering antenna pattern for an array of mm-wave antennas to establish the mm-wave communication with the light enabled 5G access point; and
   a beamsteering module to determine a selected beamsteering pattern from the information handling system to the light-enabled 5G access point to initiate the mm-wave communication with the light-enabled 5G access point based on signal quality with the array of mm-wave antennas above a threshold level.

2. The information handling system of claim 1, wherein the light sensors detect an infrared light emitted from the light source of the light-enabled 5G access point emitted at a pulse pattern recognizable by the light sensors.

3. The information handling system of claim 1, wherein the light sensors detect an infrared light emitted from the light source of a plurality of light-enabled 5G access points and an access point identification module to distinguish among the plurality of light-enabled 5G access points based on a pulse pattern of emitted infrared light recognizable by the light sensors.

4. The information handling system of claim 1, wherein the beamsteering module further determines that the information handling system is within range of a plurality of light-enabled 5G access points and determines which of the plurality of light-enabled 5G access points to enable the mm-wave connection with based on highest signal strength.

5. The information handling system of claim 1, further comprising an access point identification module to determine which light-enabled 5G access point among a plurality of light-enabled 5G access points to initiate the mm-wave communication.

6. The information handling system of claim 1, further comprising a wireless interface adapter to forward the light sensing directionality location data to the light-enabled 5G access point to assist the light-enabled 5G access point to conduct beamsweeping of a plurality of angles for a mm-wave antenna array at the light-enabled 5G access point using the light sensing directionality location data.

7. The information handling system of claim 1, further comprising a wireless interface adapter to forward the light sensing directionality location data to the light-enabled 5G access point to cause the light-enabled 5G access point to reciprocal beam angle for mm-wave communication.

8. The information handling system of claim 1, wherein the information handing system further comprises a camera that detects an intensity of light emitted from the light-enabled 5G access point to determine the distance from the information handling system to the light-enabled 5G access point.

9. The information handling system of claim 1, wherein the access point identification module executes a simultaneous localization and mapping (SLAM) process to iteratively calculate the distance and angle of the light-enabled 5G access point relative to the information handling system.

10. A method of establishing a millimeter-wave connection for an information handling system with a 5G access point, comprising:
with a processor of the information handling system, acquiring positional data from positional sensors;
with the processor, estimating a position of the information handling system relative to a light-enabled 5G access point based on the acquired positional data;
with a plurality of light sensors of the information handling system, detecting light emitted from a light source of the light-enabled 5G access point placed at locations in an area to determine relative angle data descriptive of an angle of the information handling system relative to the light-enabled 5G access point;
with the processor, comparing the estimated position of the information handling system with the relative angle data and updating light sensing directionality location data descriptive of the location of the information handling system relative to the light-enabled 5G access point;
with executing a beamsteering module:
utilize the updated light sensing directionality location data to assist in conducting a beamsweeping process to select an angle for a mm-wave antenna array at the information handling system to determine a selected beamsteering pattern from the information handling system to the light-enabled 5G access point to initiate the mm-wave communication with the light-enabled 5G access point based on signal quality above a threshold level.

11. The method of claim 10, further comprising:
determining that the information handling system is within range of the light-enabled 5G access point to enable the mm-wave connection between the information handling system and light-enabled 5G access point using the selected beamsteering pattern.

12. The method of claim 10, wherein the light sensors detect an infrared light emitted from the light source of the light-enabled 5G access point.

13. The method of claim 10, wherein the positional sensors are one or more of a gyroscope, an accelerometer, a global positioning satellite (GPS) sensor, or a tilt sensor.

14. The method of claim 10, further comprising:
with an array of mm-wave antennas, initiating the mm-wave communication with the access point based on the calculated beamsteering pattern.

15. An information handling system, comprising:
a processor;
a memory;
a positional sensor to acquire positional data and estimate a position of the information handling system relative to a first, light-enabled 5G access point selected from a plurality of light-enabled 5G access points based on the acquired positional data;
a plurality of light sensors to scan for and detect light emitted from a light source of at least one of the plurality of light-enabled 5G access points and identifying the first light-enabled 5G access point based on a pulse pattern of emitted light detected by the light sensors and recognizable by an access point identification module to distinguish among the plurality of light-enabled 5G access points;
a light sensing directionality comparison module to determine relative angle data descriptive of an angle of the information handling system relative to the first light-enabled 5G access point;
the light sensing directionality comparison module utilizing the estimated position of the information handling system with relative angle data to the first light enabled 5G access point to assist a beamsteering process in selecting a beamsteering antenna pattern for an array of mm-wave antennas to establish the mm-wave communication with the first light enabled 5G access point and to select a beamsteering pattern from the information handling system to the first light-enabled 5G access point to initiate the mm-wave communication.

16. The information handling system of claim 15, wherein the light sensing directionality comparison module selects the identified, first light-enabled 5G access point based on signal quality with the array of mm-wave antennas exceeding a threshold level.

17. The information handling system of claim 15, further comprising a wireless interface adapter to forward the light sensing directionality location data to the first light-enabled 5G access point to assist the first light-enabled 5G access point to conduct beamsweeping of a plurality of angles for a mm-wave antenna array at the first light-enabled 5G access point using light sensing directionality location data for the estimated position of the information handling system.

18. The information handling system of claim 15, further comprising an access point identification module to identify known locations of the plurality of light-enabled 5G access points to determine the estimated position of the information handling system.

19. The information handling system of claim 15, further comprising a mm-wave communication handoff module to transfer a mm-wave communication between the first light-enabled 5G access point and the information handling system to a mm-wave communication between the information handling system to a second light-enabled 5G access point using light sensing directionality location data for the estimated position of the information handling system relative to the second light-enabled 5G access point.

20. The information handling system of claim 15, wherein the positional sensor comprises one or more of a gyroscope, an accelerometer, a camera, or a proximity sensor.

* * * * *